United States Patent [19]
Talbott

[11] Patent Number: 5,212,903
[45] Date of Patent: May 25, 1993

[54] GREENHOUSE CONSTRUCTION AND LIQUID DISTRIBUTION SYSTEM

[76] Inventor: Gene B. Talbott, Rte. 2, Box 200, Banks, Oreg. 97105

[21] Appl. No.: 743,269

[22] Filed: Aug. 9, 1991

Related U.S. Application Data

[62] Division of Ser. No. 354,501, May 19, 1989, Pat. No. 5,038,517.

[51] Int. Cl.$^5$ ............................................... A01G 9/24
[52] U.S. Cl. ............................................ 47/17; 47/58; 239/242
[58] Field of Search .............. 239/242, 70, 210, 263.1, 239/263.3; 47/17, 58

[56] References Cited

U.S. PATENT DOCUMENTS

| | | |
|---|---|---|
| 762,014 | 6/1904 | Wittbold . |
| 910,400 | 1/1909 | Lischer .................... 47/17 |
| 1,508,028 | 9/1924 | Robinson . |
| 1,696,385 | 12/1928 | Coles . |
| 1,997,912 | 4/1935 | Phinn . |
| 2,039,768 | 5/1936 | Bird .................... 239/263.1 |
| 2,723,493 | 11/1955 | Stoller . |
| 2,734,583 | 2/1956 | Milan . |
| 3,073,532 | 1/1963 | Rinkewich ................ 239/242 |
| 3,398,779 | 8/1968 | Kuss . |
| 3,786,991 | 1/1974 | Ingham .................. 239/242 |
| 3,812,616 | 5/1974 | Koziol . |
| 3,882,921 | 5/1975 | Sandall . |
| 4,091,584 | 5/1978 | Brown . |
| 4,120,342 | 10/1978 | Mama et al. . |
| 4,484,777 | 11/1984 | Michel . |
| 4,505,512 | 3/1985 | Schmeichel et al. . |
| 4,518,193 | 5/1985 | Heider et al. . |
| 4,657,062 | 4/1987 | Tuerk . |
| 4,691,957 | 9/1987 | Ellingson . |
| 4,852,595 | 8/1989 | Baier et al. ............... 239/263.3 |

FOREIGN PATENT DOCUMENTS

| | | |
|---|---|---|
| 0239516 | 9/1987 | European Pat. Off. . |
| 2329266 | 2/1975 | Fed. Rep. of Germany . |
| 1363920 | 5/1964 | France . |
| 8401662 | 3/1984 | Netherlands . |

Primary Examiner—Richard E. Chilcot, Jr.
Assistant Examiner—Christopher Kent
Attorney, Agent, or Firm—Kolisch, Hartwell, Dickinson, McCormack & Heuser

[57] ABSTRACT

A greenhouse for providing improved growth and environmental control for growing plants comprising a frame defining a structure having a given length and width forming a bounded, interior region for receiving plants; a flexible cover positionable over the frame for providing a roof enclosure for the structure; an elongate roller substantially extending along the length of the structure secured to a lengthwise edge of the cover; and a power source coupled to the roller for travel therewith operable for rotatably driving the roller about its longitudinal axis to retract or extend the cover relative to the frame. A water distribution system for the greenhouse is also disclosed. The water distribution system includes a distribution conduit with spaced-apart spray nozzles positioned adjacent the top interior of the greenhouse. A power drive system oscillates the conduit through a defined arc to distribute water downwardly to plants growing in the greenhouse. A timing means associated with the power drive is selectively operable for delaying the return rotation of the conduit to ensure that the outside edges of the spray pattern will be watered evenly.

5 Claims, 4 Drawing Sheets

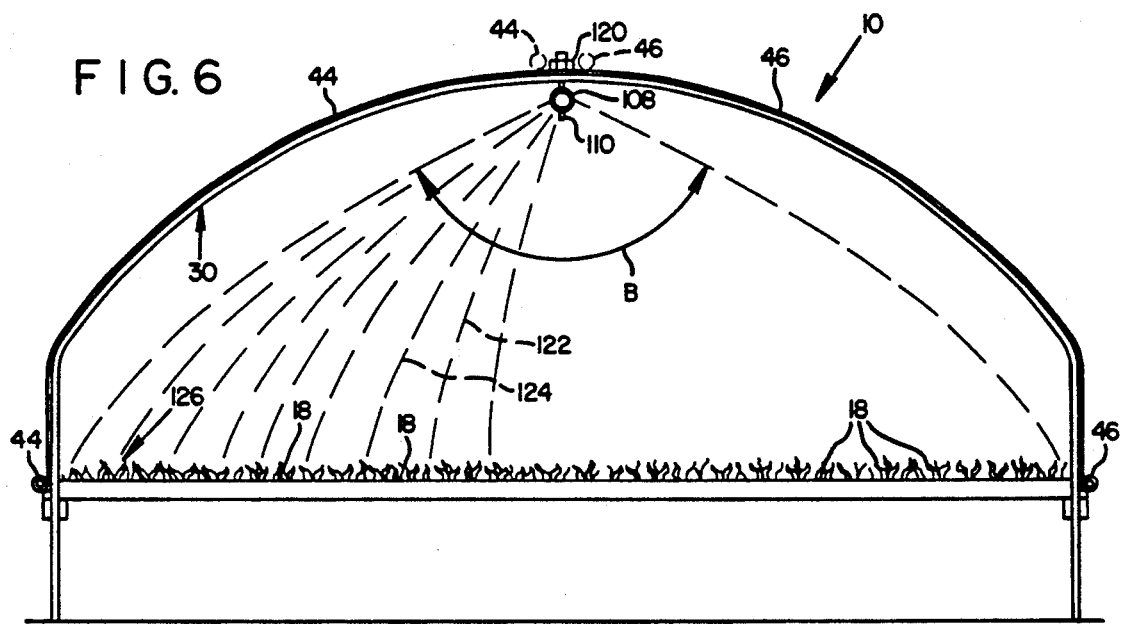
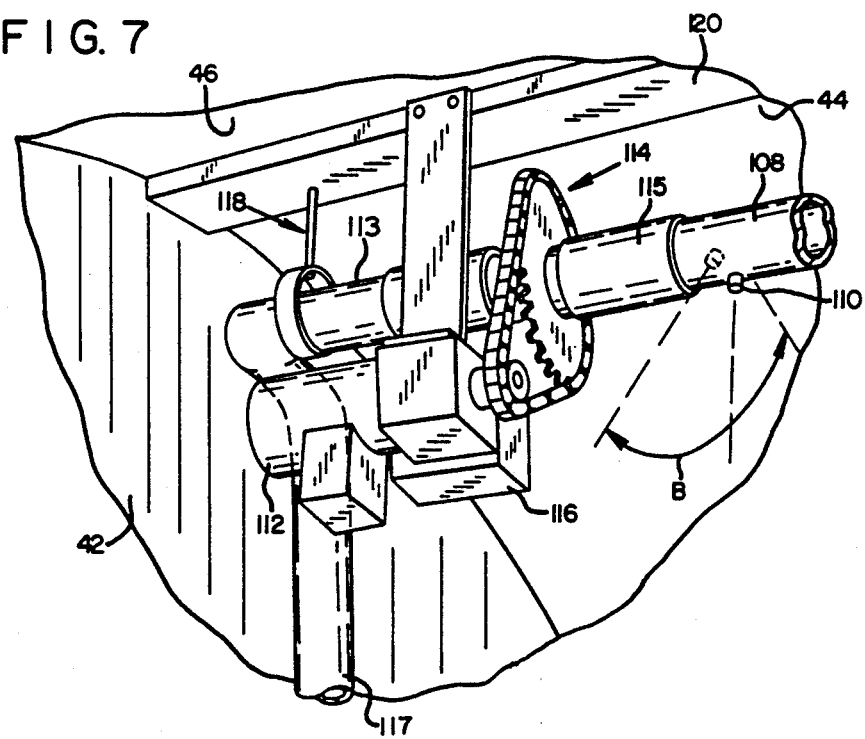

GREENHOUSE CONSTRUCTION AND LIQUID DISTRIBUTION SYSTEM

This is a divisional application of pending application Ser. No. 07/354,501, filed May 19, 1989, subsequently issued as U.S. Pat. No. 5,038,517.

BACKGROUND AND SUMMARY OF THE INVENTION

The present invention relates to agriculture, and more particularly to a novel greenhouse construction which significantly enhances the capability of plant growth in a controlled environment. In general terms, the present invention is directed to a greenhouse construction in which the roof, formed of flexible material such as double ply polyethylene, is automatically retractable and closeable, from opposite sides of the greenhouse, thereby selectively permitting or inhibiting entry of direct sunlight on plants being grown within the greenhouse.

Greenhouses have been used for many years to facilitate a controlled environment for plant growth, and typically take the form of some type of framed construction having a roof which will permit some degree of penetration by the sun's rays. Plants are placed within the greenhouse and, in conventional constructions, are watered and kept at a temperature above freezing. One problem with conventional greenhouse constructions which have double ply covers is that temperature inside the greenhouse may become relatively high, i.e. in the neighborhood of 80-90 degrees during the daytime. However, at night, the temperature within the greenhouse may approach that of freezing. The result is that the plants tend to "stretch," meaning that their stems tend to elongate and become somewhat stringy, accompanied by a weak leaf system as well as weak roots. This is caused by the plants reaching for light, the stretching being promoted by the large temperature differential which may occur in the greenhouse between daytime and nighttime.

If the plants are grown in a greenhouse for later transplanting, those plants which have been deformed by stretching, as described above, provide rather poor candidates for transplanting. The stems may easily break, and weak root systems mean that the roots may not hold on to soil, and a poor transplant will result, meaning lower crop yields in a field. Preferably plants for row crops, such as celery, broccoli, brussel sprouts, cabbage, etc. come from the greenhouse with short, stocky stems and relatively thick leaves and a strong root system. However, that type of plant will not be developed in a greenhouse with a high temperature differential or "dif." Accordingly, it has been proposed to provide a greenhouse in which the cover or roof may be rolled back to allow more sunlight in during the day and also to prevent excessive heat build-up within the greenhouse during excessively hot or high solar gain days.

Conventionally, many greenhouses use a double ply polyethylene cover so that a layer of air is sandwiched between the two plies. The result is both beneficial and detrimental, namely, while heat loss is held down at night, the double ply material and insulating air barrier also decrease light during the day up to 50 percent and more. If light into the greenhouse is cut down, then poor growth results. The essential problem is to develop a greenhouse which will provide uniform growth of plants by narrowing down the temperature differential between day and night, and by also providing for sufficient sunlight and maintaining growth-enhancing nighttime temperatures.

Moreover, conventional greenhouses used in agricultural operations may provide watering or irrigation by means of complex, expensive and multi component systems. These include assemblies in which there is a boom extending widthwise of the greenhouse and positioned above the growing plants. The boom is provided with a plurality of nozzles, and there is usually some type of motorized system for hauling the boom lengthwise for spraying the plants. Such a system not only has high initial construction costs, but also maintenance is expensive because of breakdowns and repairs.

It has been proposed to roll tack the roof of a greenhouse to permit increased light, with one example being disclosed in Koziol (U.S. Pat. No. 3,812,616). In that patent, a small, portable greenhouse is provided in which a roll up bar is positioned along the sides, and is connected to a flexible cover so that it may be manually rolled up into a retracted position to increase the sunlight. Conversely, the roll up bar may be rolled downwardly so that the greenhouse is covered. Another example of a greenhouse, this time a larger type for agricultural purposes, is disclosed in Nagoya (U.S. Pat. No. 4,348,833). There a mechanism is provided for rolling up, to a certain extent, the roof portion of the greenhouse cover. However, the activating mechanism consists of a cumbersome motor/flexible driving shaft for connection to a roll up bar. The result is a rather complicated system and one which does not appear to be practical for wide spread agricultural use.

With the above problems inherent in conventional greenhouse designs in mind, it is a principal object of the present invention to provide a greenhouse for providing improved growth and environmental control to growing plants which includes a frame means defining a structure having a given length and width which forms a bounded, interior region for receiving plants, wherein a flexible cover means positionable over the frame means provides a roof enclosure for the structure, and elongate roller means substantially extending along the length of the structure is secured to a lengthwise edge of the cover means so that a power driven means coupled to the roller means is operable for selective, bi-directional rotation of the roller means about its longitudinal axis to extend or retract the cover means relative to the structure. The result is a greenhouse in which a vastly simplified arrangement is provided to either roll upwardly or downwardly the cover means, inasmuch as the power driven means or motor actually travels with the roller means. Thus, complicated transmissions and drives are not required, and selected openings are presented to allow direct sunlight into the greenhouse.

Another object of the present invention is to provide a greenhouse in which a positive clamping of retaining means is provided adjacent to the side of the greenhouse for engaging and firmly holding the roller means when the power driven means has displaced the roller means and the cover means into its fully extended or closed position.

Still another object of the present invention is to provide a tensioning means, such as a tension cord or the like, which is secured adjacent an end edge of the cover means for urging the ends of the cover means outwardly thereby to ensure that the cover means is fully extended lengthwise of the greenhouse.

It is still another object of the present invention to provide a novel tether means for tethering the power driven means into the ground or the structure itself so that during operation of the power driven means, it will follow along the structure during extension or retraction of the cover means.

Yet a further object of the present invention is to provide a greenhouse which includes a liquid distribution means for irrigation or other spray defined by an elongate, nozzled conduit means extending longitudinally of the greenhouse substantially centrally thereof and above the growing plants. A power drive or oscillating means is selectively actuated to rotate the conduit means through an arc so that water transferred into the conduit means is dispensed over a preselected range to ensure complete irrigation of the plants. In addition, a timing mechanism is provided so that plants adjacent the outer sides of the greenhouse will be subjected to a longer watering or irrigating sequence to ensure that they receive the same amount of water as plants which are disposed more directly beneath the conduit means.

These and additional objects ant advantages of the present invention will be more readily understood after a consideration of the brief description of the drawings and the following detailed description of the preferred embodiment.

BRIEF DESCRIPTION OF THE DRAWINGS

FIG. 6 is a schematic view of a water spray pattern from a centrally positioned, rotatable conduit means for irrigating or spraying the plants; and FIG. 7 is an enlarged view, taken from inside the greenhouse and showing a driving mechanism and timing means for oscillating the conduit means.

DETAILED DESCRIPTION OF THE PREFERRED EMBODIMENTS

As mentioned that the outset, it is a principal object of the present invention to provide a greenhouse which will improve growth and environmental control for growing plants. To that end, the greenhouse of the present invention is constructed to provide several novel and important features, a first one of which includes a novel mechanism and assembly for extending and retracting a cover means on the greenhouse.

Figure 1:
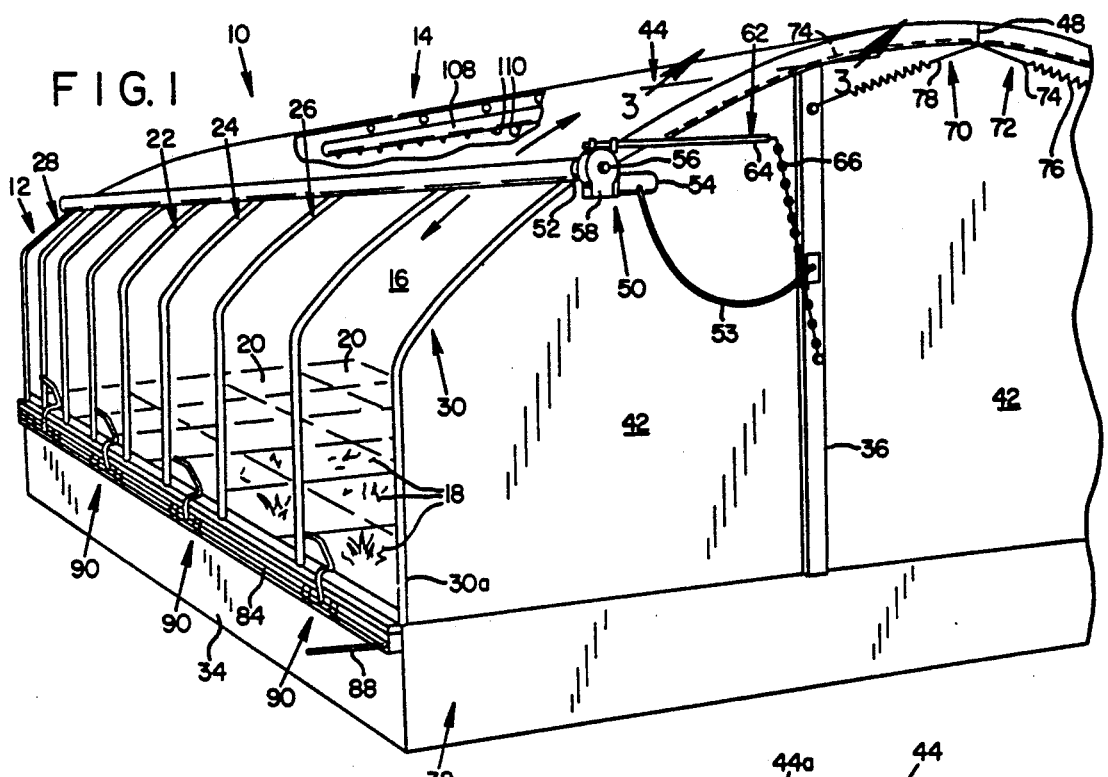
FIG. 1 is a perspective view of the greenhouse of the present invention, taken from one end thereof, illustrating the cover means of one side retracted or rolled up about midway, with a portion of the cover means broken away to illustrate a conduit means of the liquid distribution means.
Figure 2:
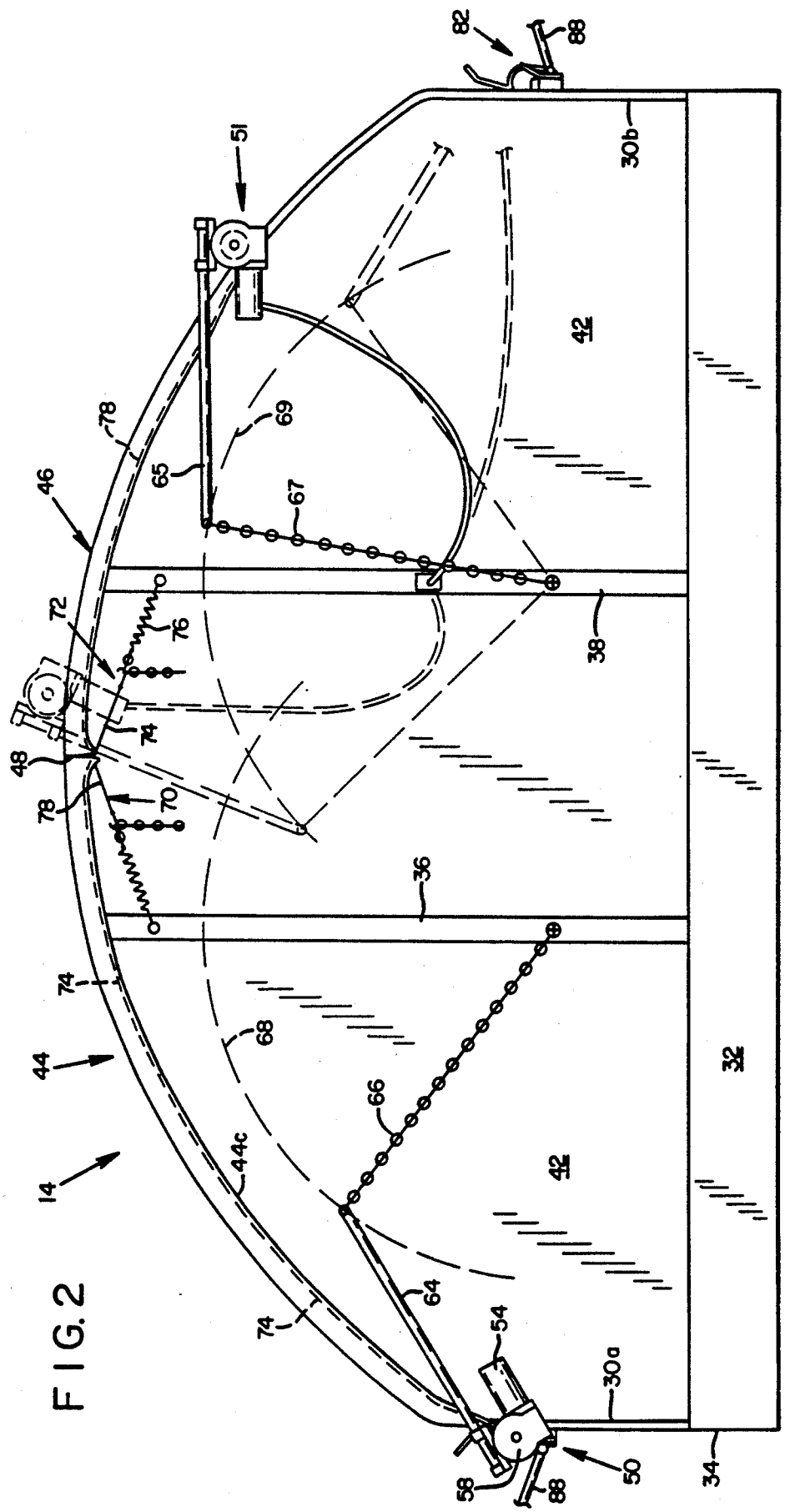
FIG. 2 is an end view of the greenhouse of FIG. 1, showing a pair of power driven means, at different positions, illustrating extending or retracting their respective cover means.

As shown in FIGS. 1 and 2, a greenhouse according to the present invention is generally indicated at 10, and includes a frame means generally indicated at 12 and a flexible cover means made of polyethylene material, for example, generally indicated at 14. The frame means defines a structure having a given length and width, and forms a bounded, interior region 16 for receiving plants 18 which are disposed within a plurality of trays, such as indicated at 20. The frame means includes a plurality of spaced-apart tubular frame members, such as indicated at 22, 24, 26, etc., with gable end frame members being shown at 28 and 30. Each frame member is provided with upstanding vertical components, such as components 30a, 30b of frame member 30, as well as bow shaped arcuate sections such as shown at 30c which spans between components 30a, 30b. A bottom foundational frame structure, indicated at 32, 34 (the other sides being unshown) are provided for a bottom support. Suitable structural uprights, such as indicated at 36, 38 are also provided at the gable ends, which establish surfaces for attachment of end panels of flexible material, such as polyethylene end panel 42. While not specifically illustrated in FIG. 1, there is provided another end panel at the downstream end from end panel 42. Additionally, while the frame members, such as end frame member 30 are shown with an arcuate central profile, it is also contemplated that any convenient form could be used such as a frame member having peaked construction, etc. Moreover, the frame members can be constructed from any suitable tubular material, including aluminum, plastic materials, etc.

With respect to cover means 14, it is to be noted that it includes a pair of adjoining cover sections generally indicated at 44, 46 which meet along their longitudinal upper edges at 48 along the length of the greenhouse adjacent its top. Each of the cover sections is substantially identical, and each is provided with similarly arranged power driven means so that each can be extended or retracted relative to the frame means. Specifically, with reference to cover section 44, it is to be noted that it includes a pair of "plys," such as spaced-apart plys 44a, 44b, which are separated by a pressurized air space indicated at 45 (see FIG. 3). The flexible cover means is positionable over the frame means for providing a roof for the entire structure, and is mentioned previously, sections 44, 46 may be extended or retracted to close or open up the interior region to sunlight and ventilation.

Figure 4:
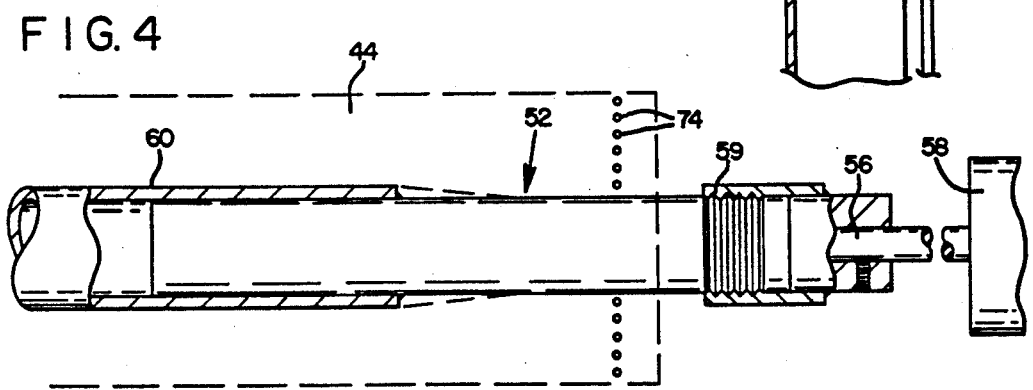
FIG. 4 is an enlarged view of a roller means and its coupling to a power driven means.

Specifically, a power driven means 50 is coupled to an elongate roller means 52 for actuating the roller means to roll the cover means, such as cover section 44, up or down. Roller means 52 is dimensioned for substantially extending along the length of the greenhouse structure, and is secured to a lengthwise edge of cover section 44. As shown in FIG. 1, cover section 44 is rolled about half way up. Power driven means 50 includes a drive motor 54 which drives a shaft 56 by means of a gear reduction unit 58. A power line is shown at 53. As shown in FIG. 4, drive shaft 56 is interconnected by means of a coupling 59 to roller means 52 which includes a central concentric section 60. As shown in FIG. 4, cover section 44 has been rolled up so as to increase its concentric diameter around roller means 52 in the approximate position shown in FIG. 1. In any event, power driven means 50 is operable for rotatably driving the roller means about its longitudinal axis in a selected direction thereby extending or retracting cover section 44 of the cover means relative to the frame means. Cover section 44 has been moved to a closed position as shown to the left in FIG. 2. It may be retracted or opened up to the half way position shown in FIG. 1, or opened up all the way to the top adjacent adjoining line 48.

In order to keep power driven means 50 from merely spinning or rotating with roller means 52 as power is supplied, a stabilizing means, such as indicated at 62 is provided to interconnect each of the power driven means to an upright, such as that indicated at 36 in FIG. 2, or other stationary support. Stabilizing means 62 is defined by rigid arm means 64 extending outwardly or toward the central axis of the greenhouse, which has a distil end thereof secured to a flexible tether means 66, such as a chain, which in turn is secured at its opposite end to the rigid support of upright 36. Tether means 66, in combination with arm means 64, stabilizes power driven means 50 as it rotates roller means 52 so that the power driven means does not spin freely. As power driven 50 is actuated, it will travel along an arcuate upper path, defined by the arcuate profile of frame members 22, 24, etc. and is maintained in that position following an arc 68 defined by the end of arm means 64 and its connection to tether means 66 as shown in FIG. 2. A second power driven means 51 is also stabilized by a second arm means 65 and a second tether means 67. As shown in FIG. 2, second power driven means 51 moves along a path so that it is oriented in the position indicated in dashed outline at the top of the greenhouse as illustrated.

Figure 3:
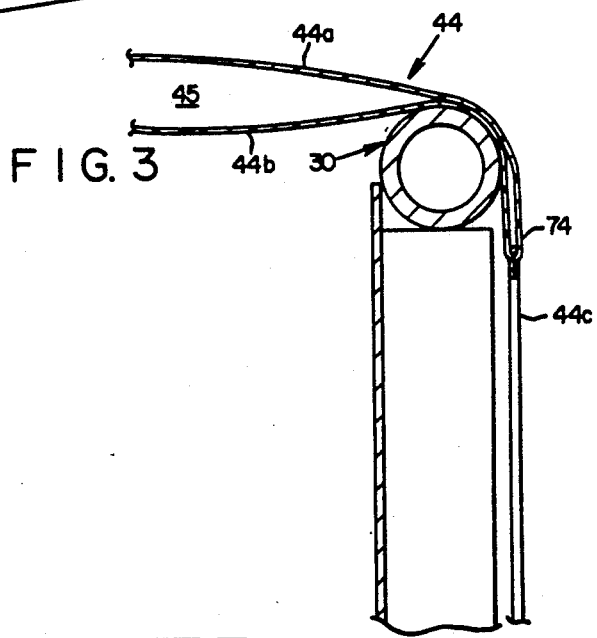
FIG. 3 is a cross-sectional view taken along lines 3—3 of FIG. 1, and illustrates the use of a tensioning means to ensure that a double ply poly cover is maintained around an end frame member.

Another important feature of the present invention resides in the provision of a tensioning means, indicated generally at 70, 72 in FIGS. 1 and 2. Each tensioning means is provided for ensuring that the edges of each cover section are maintained in an overlapped manner around the end frame members. Specifically, as shown in FIG. 3, it will noted that pressurized air space 45 tends to push apart ply sections 44a, 44b. With those ply actions heat sealed or otherwise joined at end 44c, that end must be pulled over and partially around end frame member 30 so that the cover section does not collapse inwardly. To that end, tensioning means 72 has been found to be particularly advantageous. As shown in FIG. 2, tensioning means 72 includes a cord 74 which is secured at one end by biasing means 76 to upright 38, with the cord extending through the end of cover section 44, and running entirely along its end dimension for connection to roller means 52. As shown in FIG. 2, cord 74, shown in dashed lines after it enters into cover section 44, extends until it is secured to roller means 52 as shown in FIG. 4. Similarly, tensioning means 70, which includes cord 78 and biasing means 80, extends through cover section 46 adjacent its sealed edge, and is connected to the roller means which is actuated by power driven means 51. Thus, what has been described, is a tensioning means which, during rolling up of an associated cover section, maintains a taught condition by means of a biasing means, such as that indicated at 76 and a cord, such as that indicated at 72, to urge the edge of a cover section over an associated end frame member. The result is that a sealed cover is provided when each cover section is extended to its fully closed position.

Figure 5:
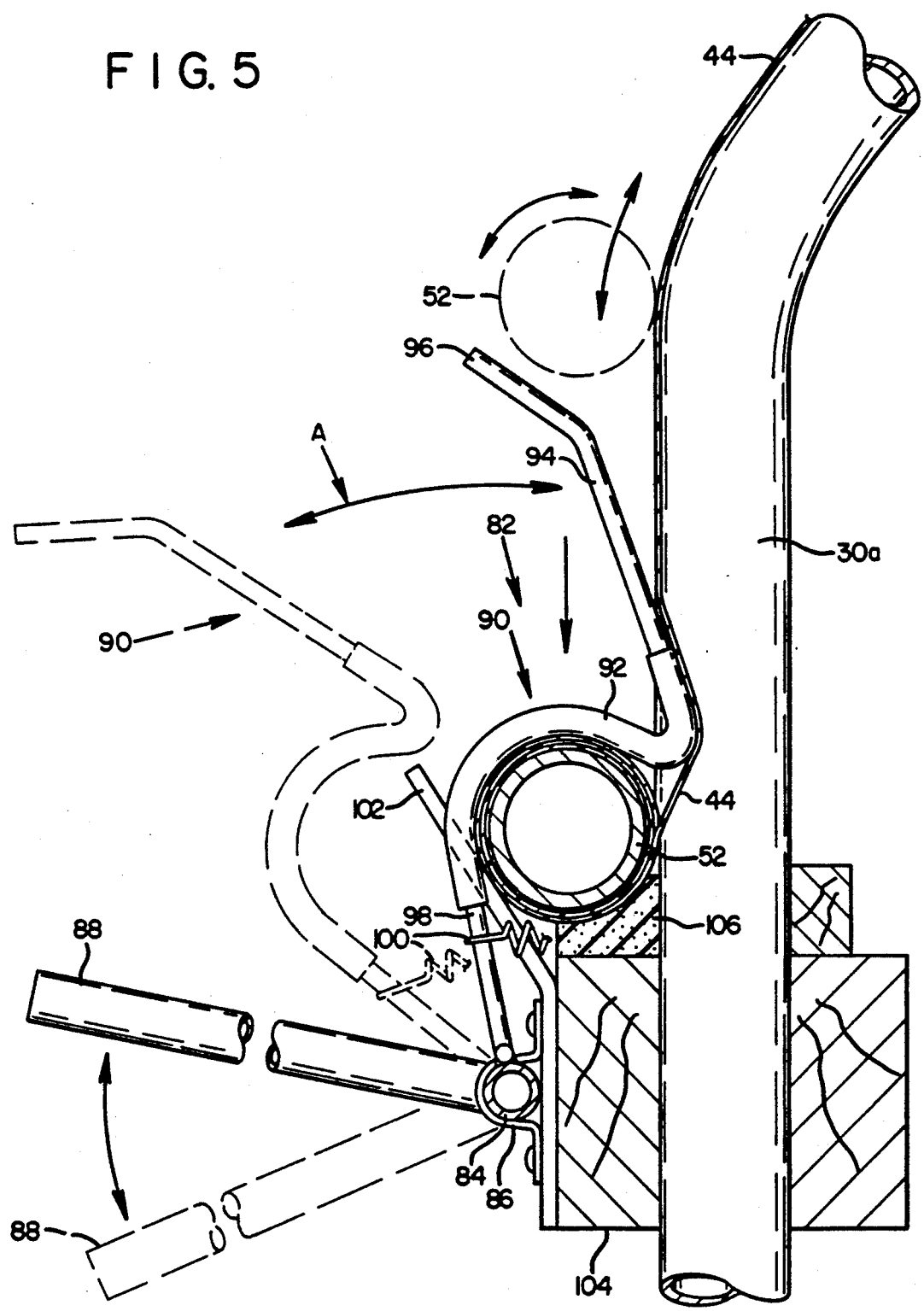
FIG. 5 is an enlarged view of a retaining means for holding the roller means in its fully extended position wherein the cover means is fully closed.

Turning now to another important feature of the present invention, attention is directed to FIG. 5 which is to be viewed in connection along with FIG. 1. A retaining means, generally indicated at 82, is provided for clamping and holding onto the roller means associated with each cover section when that cover section is fully extended into the closed position. Retaining means 82 is defined by an elongate bar 84 (see FIG. 1 also) which extends substantially along the length of the greenhouse at a lower portion thereof, and is journaled at suitable positions therealong to the greenhouse frame by means of fittings 86. A handle means 88 is secured to bar 84 at one end thereof, and extending upwardly from bar 84 are a plurality of substantially identical clamping members, each being generally indicated at 90. Focusing more particularly on the clamping members, it can be seen that each is provided with a "hook" or arcuate portion 92 dimensioned to engage roller means 52 and that portion of cover section 44 which is wrapped around the roller means when the cover section is in its fully extended or closed position as shown in FIG. 5. Extending upwardly from arcuate portion 92 of the clamping member is a guide portion 94 with a receiving end 96. A bottom portion 98 of clamping member 90, which is secured to bar 84, is connected to a return biasing means 100 which normally urges clamping member 90 into the closed position shown in FIG. 5. All of the clamping members are essentially the same, and associated with each is a final guide or stop member such as plate means 102 secured to the bottom portion of the structure as illustrated in FIG. 5. Additionally, it will be noted that running along the length of the greenhouse structure is a horizontally positioned support member 104 which supports an elongate horizontally extending pad means 106 of resilient material for resiliently receiving and supporting roller means 52. The pad means extends lengthwise of the greenhouse, and is dimensioned for receiving the roller means and providing a seal.

Retaining means 82 is normally positioned in the closed orientation as shown in FIG. 5, and return biasing means 100 normally urges clamping member against roller means 52, which in turn, is urged against pad means 106. When it is desired to retract cover section 44, one can grab handle means 88 and rotate it in a counter clockwise direction as shown by arrow A against the spring tension of return biasing means 100 so that clamping member 90 is swung to the release position as shown in dashed outline to the left. On actuation of power driven means 50, rotation is imparted to roller means 52 for moving it upwardly along vertical component 30a and then upwardly along the arcuate component of the tubular frame members to a selected, retracted position. When it is desired to return cover section 44 to its fully extended position, power driven means 50 is reversed, and roller means 52, as shown in dashed outline near the top of FIG. 5, continues its travel downwardly until it engages receiving end 96 of clamping member 90. At that time, further downward movement of roller means 52 urges the clamping outwardly in a counter clockwise direction against the spring force of return biasing means 100 until roller means is seated on pad means 106 as illustrated with plate means 102 serving to provide the final guide to further downward travel and facilitate nesting roller means 52 onto the pad means. Handle means 88, also seen in FIGS. 1 and 5, is placed adjacent each side of the greenhouse and for rotating bar 84 to release the clamping members form engagement against associated roller means prior to retraction of the cover sections.

Now, with the attention directed to FIGS. 6 and 7, a description of the present invention's unique liquid or water distribution means for irrigation will be described. FIG. 6 is a view of an end of greenhouse 10 with end panels 42 removed for purposes of clarity, and FIG. 7 is a view taken as if one were on the inside of the greenhouse looking upwardly toward the top of end panel 42. In any event, as shown in FIG. 6 (see FIG. 1 also), an elongate conduit means 108 is positioned adjacent the top interior position of the greenhouse and extends longitudinally and substantially down the length thereof (see FIG. 1 also). As shown in FIG. 7, conduit means 108 includes a plurality of spaced-apart spray nozzles 110, and is coupled at 115 to a power drive 112 by a transmission means generally indicated at 114 which includes a chain and sprocket drive. Conduit means 108 is disposed generally centrally of the width of the greenhouse, and communicates with a stationary conduit 113 which is directed to a source of liquid or water supplied under pressure. A timing means is associated with power drive 112, and it can be seen that conduit 116 is suspended by means of hanger assemblies, one being shown at 118, mounted to an elongate, centrally extending horizontal frame member 120.

The idea behind a centrally positioned and elongate extending conduit means, such as that indicated at 108, is to provide complete irrigation or other treatment, via spray action through nozzles 110, to the plants within the greenhouse. Power drive 112 and timing means 116 are selectively operable for rotating or oscillating conduit means 108 through a defined arc of predetermined angularity such as indicated at B in FIGS. 6 or 7. As shown in FIG. 6, assuming that a water sequence is to start with nozzles 110 facing generally vertically downwardly, as conduit means 108 is rotated toward the left (still viewing FIG. 6) water spray, such as indicated at 122, 124, etc. will be dispensed toward the plants disposed therebeneath. However, as conduit means 108 is rotated more toward the left as shown in FIG. 6, it should be appreciated that less water will actually travel out toward the edges, such as at region 126. If the rate of oscillation were the same, from a starting point to the left (or right), as shown in FIG. 6, the plants near the outer sides would not be sprayed with the same amount of water. Accordingly, it has been found most advantageous to provide a time delay in the watering sequence. Thus, conduit means 108 will be delayed to direct water for a longer period of time at region 126 than the regions directly beneath the conduit means. For example, if one-half the width were approximately ten feet to the outer edge of the plants, and assuming that it generally would take about five seconds to oscillate conduit means 108 from an initial position so that it sprayed to the outside edge region at 126, it may be preferable to delay return rotation of conduit means 108 so that spray is continued from the nozzles for another two seconds or thereabouts so that the outside edges will be watered evenly. The conduit means is then returned and swung so that it sprays out to the right, when viewing FIG. 6, for the second part of the cycle. The conduit means, when the nozzles are directed at their furthest reach to the right, is also delayed at that point so that even watering occurs. This occurs through the length of the greenhouse, and the nozzles are arranged so that adjacent ones have spray patterns which overlap.

Thus, what has been described with respect to the water distribution system is an elongate conduit means centrally positioned of the greenhouse selectively operable for oscillation from side to side to effect spraying of water through the plurality of nozzles spaced apart and extending downwardly throughout its length. The present invention describes a unique watering method, namely one in which water is sprayed for a selected period of time over plants, and as conduit means 108 directs spray further outwardly, the aforementioned time delay is brought into action.

SUMMARY OF ADVANTAGES OF THE PRESENT INVENTION

It should be apparent that the greenhouse of the present invention provides several very important advantages. First of all, a very simple mechanism is provided for extending or retracting the cover means of a greenhouse, such as a cover means formed of double ply polyethylene material having an insulated air barrier. Power driven means 50 is mounted so that it directly drives roller means 52 and is mounted alongside a tubular frame member so that it travels therealong during extension and retraction of the cover means. Positioning of power driven means 50 as described is accomplished by use of stabilizing means 62 including arm means 64 and tether means 66. Power driven means 50 is easily accessible for repair or replacement, and the stabilizing means includes simple and inexpensive components. Moreover, the tensioning means, such as described at 70, 72 are also of straight forward construction, and ensure that tension is provided at the outer edges of the cover means so that it is maintained in secured position during extension or retraction of the cover means.

Still another important advantage of the present invention resides in the construction of retaining means 82 and the plurality of clamping members 90 and associated components. Quickly and easily, the clamping members may be engaged or disengaged from the roller means, and a positive clamping action is provided to secure and substantially seal each cover section when it is disposed in its fully extended or closed position. The positive clamping action substantially prevents lifting of the cover sections during periods of increased wind.

Moreover, the water distribution system for irrigation ensures uniform watering of plants, and is a non complex arrangement which is vastly superior to prior art boom assemblies requiring a plurality of tracks, wheels, hoses and other components to effect irrigation. Additionally, the water distribution system of the present invention has been found particularly advantageous where trays are used for growing plants within the greenhouse. Trays generally are formed with plastic plant cells, which hold soil, but do not permit migration of irrigation water form one cell to another, thus requiring that there be some method for uniform distribution of water during irrigation. That is accomplished by the centrally positioned, elongate conduit means which is operable for being selectively rotated or oscillated, together with a time delay, for evenly watering the plants throughout the length and width of the greenhouse.

As mentioned previously, a principal purpose of providing a greenhouse with a roll-up cover is so that critical sunlight is not wasted. Greenhouses which do not have roll-up covers do not permit sufficient light penetration and additionally such covers deteriorate over time because of sunlight damage. By providing a simple mechanism, such as described in the present application, the greenhouse cover means can be quickly retracted or extended, or to what ever position is most advantageous depending upon directional orientation of the greenhouse and time of year. A problem resides in winter, because if there is not sufficient light, it is necessary to provide for more sunlight, meaning that the cover means must be efficiently and quickly retracted for a predetermined amount of time after which it should be extended or closed. In any case, the power driven means of the present invention provides for rapid and efficient retraction and extension for opening and closing of the cover means. The present greenhouse invention enables control of the critical parameters of light, temperature and ventilation. Flexibility to adapt efficiently to changing environmental conditions is provided.

While the present invention has been shown and described with reference to the foregoing preferred embodiments, it will be understood by those skilled in the art that of the changes in form and detail may be made therein without departing form the spirit and scope of the present invention as defined in the appended claims.

It is claimed and desired to secure by Letters Patent:

1. A greenhouse for providing improved growth and environmental control for growing plants comprising:
   frame means defining a structure having a top and a given length and width to form a bounded, interior region for receiving plants;
   cover means positionable over the frame means for providing a roof enclosure for the structure;
   a liquid distribution conduit having a length and a longitudinal axis and extending substantially the length of the interior region and disposed generally centrally of the width adjacent the top of the frame means, wherein spray nozzles are provided along the length of the conduit means spaced-apart there along for directing liquid downwardly onto plants disposed beneath the conduit within the interior region;
   power drive means coupled to the conduit means operable for rotating the conduit means through a defined arc about its longitudinal axis so that the conduit means oscillates reciprocally through the arc causing the nozzles to direct liquid spray along the entire length and width of the interior region; and
   timing means selectively operable to delay the reciprocal oscillation of the conduit so that increased spray is directed over a period of time to selected areas within the greenhouse.

2. The greenhouse of claim 1 wherein each oscillation of the conduit is defined by an arc having an end defining the start of a return rotation and wherein the timing means selectively delays the reciprocal oscillation by delaying the return rotation of the conduit means each time it has rotated to the end of its defined arc and is initiating return rotation, whereby the nozzles direct liquid evenly along the entire length and width of the interior region.

3. The greenhouse of claim 2 in which the timing means stops the return rotation of the conduit means for approximately two seconds each time the conduit means reaches the end of its defined arc.

4. A method of distributing liquid for irrigating a greenhouse having an interior defining a plant growing area, the method comprising the following steps:
   directing liquid to be distributed into a liquid distribution conduit having a length and a longitudinal axis mounted for rotation about the longitudinal axis of the conduit on the interior of the greenhouse above the plant-growing area of the greenhouse, the conduit including a plurality of spray nozzles at intervals along the length of the conduit for directing liquid spray onto the plant growing area in the greenhouse disposed beneath the conduit,
   rotating the conduit about its longitudinal axis from side to side through a predetermined angular range which forms a downwardly-opening arc while directing liquid into the conduit, including reversing rotation of the conduit when the conduit has rotated through a predetermined angle, whereby liquid spray from the nozzle is distributed generally downwardly in an oscillating manner by the spray nozzles, and
   delaying the reverse rotation of the conduit by a selected time delay interval each time the conduit reverses direction, whereby an even distribution of liquid spray is provided over the plant growing area sprayed by the spray nozzles.

5. A method as in claim 4 in which the step of delaying the reverse rotation of the conduit includes stopping the rotation of the conduit for approximately two seconds each time the rotation of the conduit is reversed.

* * * * *